US007123780B2

(12) United States Patent
Carrig

(10) Patent No.: US 7,123,780 B2
(45) Date of Patent: Oct. 17, 2006

(54) RESOLUTION ENHANCEMENT FOR IMAGES STORED IN A DATABASE

(75) Inventor: James J. Carrig, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 507 days.

(21) Appl. No.: 10/021,111

(22) Filed: Dec. 11, 2001

(65) Prior Publication Data

US 2003/0108252 A1   Jun. 12, 2003

(51) Int. Cl.
    *G06K 9/32* (2006.01)
(52) U.S. Cl. ............................... 382/299; 345/698
(58) Field of Classification Search ............... 382/299; 345/698–699
    See application file for complete search history.

(56) References Cited

U.S. PATENT DOCUMENTS

| | | | | |
|---|---|---|---|---|
| 4,683,496 A | * | 7/1987 | Tom | 348/625 |
| 4,924,521 A | * | 5/1990 | Dinan et al. | 382/254 |
| 4,979,229 A | * | 12/1990 | Moolenaar | 382/299 |
| 5,297,219 A | * | 3/1994 | Weldy | 382/299 |
| 5,301,037 A | * | 4/1994 | Kang et al. | 358/451 |
| 5,657,402 A | * | 8/1997 | Bender et al. | 382/284 |
| 5,696,848 A | * | 12/1997 | Patti et al. | 382/254 |
| 5,767,987 A | * | 6/1998 | Wolff et al. | 358/447 |
| 5,852,470 A | * | 12/1998 | Kondo et al. | 348/448 |
| 6,084,989 A | * | 7/2000 | Eppler | 382/293 |
| 6,094,226 A | * | 7/2000 | Ke et al. | 348/446 |
| 6,151,416 A | * | 11/2000 | Kondo et al. | 382/261 |
| 6,155,704 A | * | 12/2000 | Hunt et al. | 342/25 F |
| 6,155,726 A | * | 12/2000 | Ishikawa et al. | 396/575 |
| 6,192,161 B1 | * | 2/2001 | Kondo et al. | 382/261 |
| 6,275,988 B1 | * | 8/2001 | Nagashima et al. | 725/8 |
| 6,285,804 B1 | * | 9/2001 | Crinon et al. | 382/299 |
| 6,307,560 B1 | * | 10/2001 | Kondo et al. | 345/619 |
| 6,324,309 B1 | * | 11/2001 | Tokuyama et al. | 382/300 |
| 6,519,369 B1 | * | 2/2003 | Kondo et al. | 382/261 |
| 6,539,120 B1 | * | 3/2003 | Sita et al. | 382/233 |
| 6,553,153 B1 | * | 4/2003 | Cui | 382/298 |
| 6,591,398 B1 | * | 7/2003 | Kondo et al. | 714/2 |
| 2005/0008260 A1 | * | 1/2005 | Kondo et al. | 382/299 |

OTHER PUBLICATIONS

Takalp, A.M., Ozkan, M.K., Sezan, M.I., "High-Resolution Image Reconstruction from Lower-Resolution Image Sequences and Space-Varying Image Restoration", Acoustics, Speech and Signal Processing, 1992. ICASSP-92., 1992 IEEE Internatinal Conference on.*

Patti, A.J., Sezan, M.I., Tekalp, A.M., "High Resolution Standards Conversion of Low Resolution Video", Acoustics, Speech, and Signal Processing, 1995. ICASSP-95., 1995 International Conference on.*

(Continued)

*Primary Examiner*—Bhavesh M. Mehta
*Assistant Examiner*—Sath V. Perungavoor
(74) *Attorney, Agent, or Firm*—Blakely, Sokoloff, Taylor & Zafman LLP

(57) ABSTRACT

A method and apparatus for the enhancement of images stored in a database are disclosed. A first image at a first resolution and a second image at second resolution are used to generate an enhanced image at a third resolution.

26 Claims, 14 Drawing Sheets

OTHER PUBLICATIONS

Plaziac, N., "Image Interpolation Using Neural Networks", 1999, Image Processing, IEEE Transactions on, ISSN: 1057-7149.*

Tatem, A.J., Lewis, H.G., Atkinson, P.M., Nixon, M.S., "Super-Resolution Target Idenification from Remotely Sensed Images Using a Hopfield Neural Network", 2001, Geoscience and Remote Sensing, IEEE Transactions on, ISSN:0196-2892.*

* cited by examiner

| -0.252102 | 0.612161 | -0.010896 |
| 0.279372 | 0.000000 | 0.000000 |
| 0.157611 | 0.000000 | 0.214782 |

| -0.3018523 | 0.5966274 | -0.0087446 |
| 0.4727620 | 0.0000000 | 0.0000000 |
| 0.0000000 | 0.0000000 | 0.2419460 |

RESOLUTION ENHANCEMENT FOR IMAGES STORED IN A DATABASE

FIELD OF THE INVENTION

The present invention pertains to image processing. More particularly, the present invention relates to resolution enhancement for images stored in a database.

BACKGROUND OF THE INVENTION

Many companies are proposing home networking databases, media servers, set-top boxes and the like to manage the wide variety of data that a user might collect. Instead of simply storing this data, a smart media server might use the opportunity to enhance this data to improve a viewing experience. One such possibility is to search the database for video objects similar to the one currently being viewed. The search might include data that is acquired before or after the data being improved. When data samples are combined with samples taken at a different time there may be some data misalignment. Differently aligned data may be exploited to enhance the displayed resolution of the object. However, several limitations have prevented use of resolution enhancement in home networking database applications and particularly on video images with data on irregular grids.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for resolution enhancement for images stored in a database are described.

Figure 1:
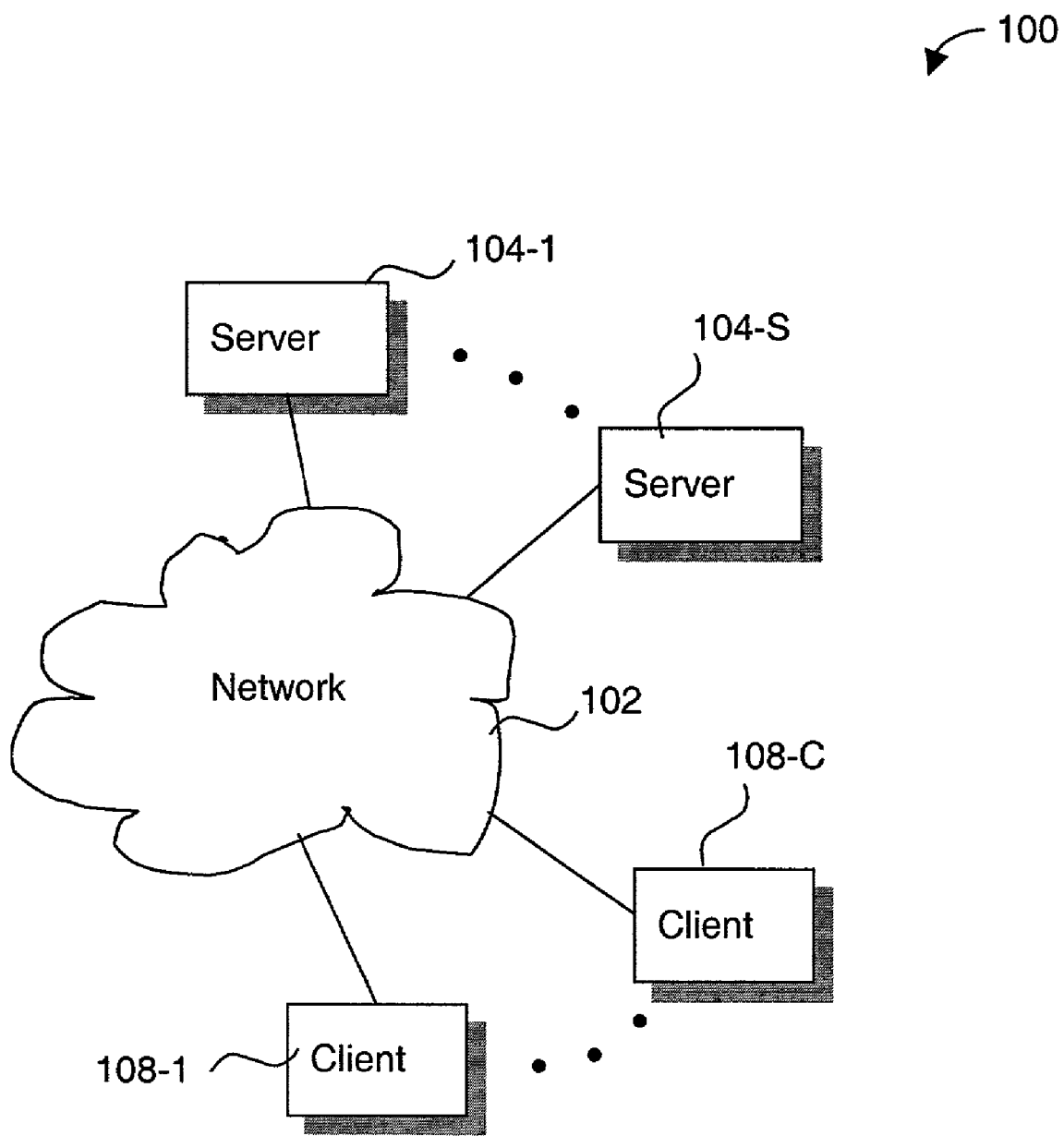
FIG. 1 illustrates a network environment in which the system and method of the present invention may be implemented.

FIG. 1 illustrates a network environment 100 in which the techniques described may be applied. As shown, several computer systems in the form of S servers 104-1 through 104-S and C clients 108-1 through 108-C are connected to each other via a network 102, which may be, for example, a home based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

In one example, a home based network may consist of disk storage connected to computing and viewing resources. In such an environment, when the network and resources are not in active use by users, the systems may be programmed to retrieve video images stored on the system and proceed as described below, using the present invention to enhance the resolution of such images, and store them back to the disk for later viewing by a user.

In another example, a home based network with images may utilize resources on another network for enhancement. For example, resources external to the home based network, may have more capability and a user may be willing to pay for enhancement using these resources. The enhanced images may either be stored locally or remotely, however, it is likely that a commercial service would require a payment before the user viewed the video images.

Figure 2:
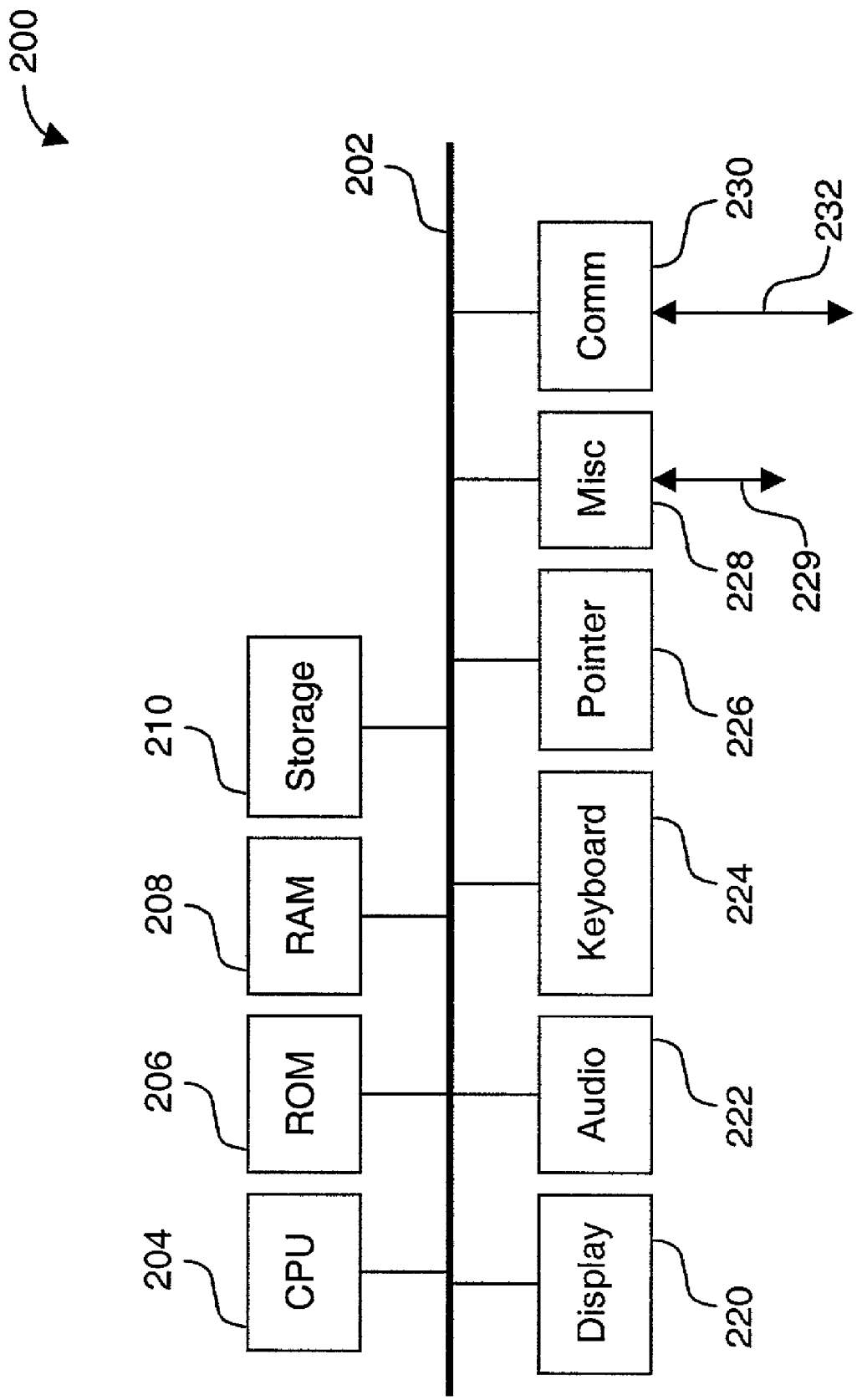
FIG. 2 is a block diagram of a computer system.

FIG. 2 illustrates a computer system 200 in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Figure 3:
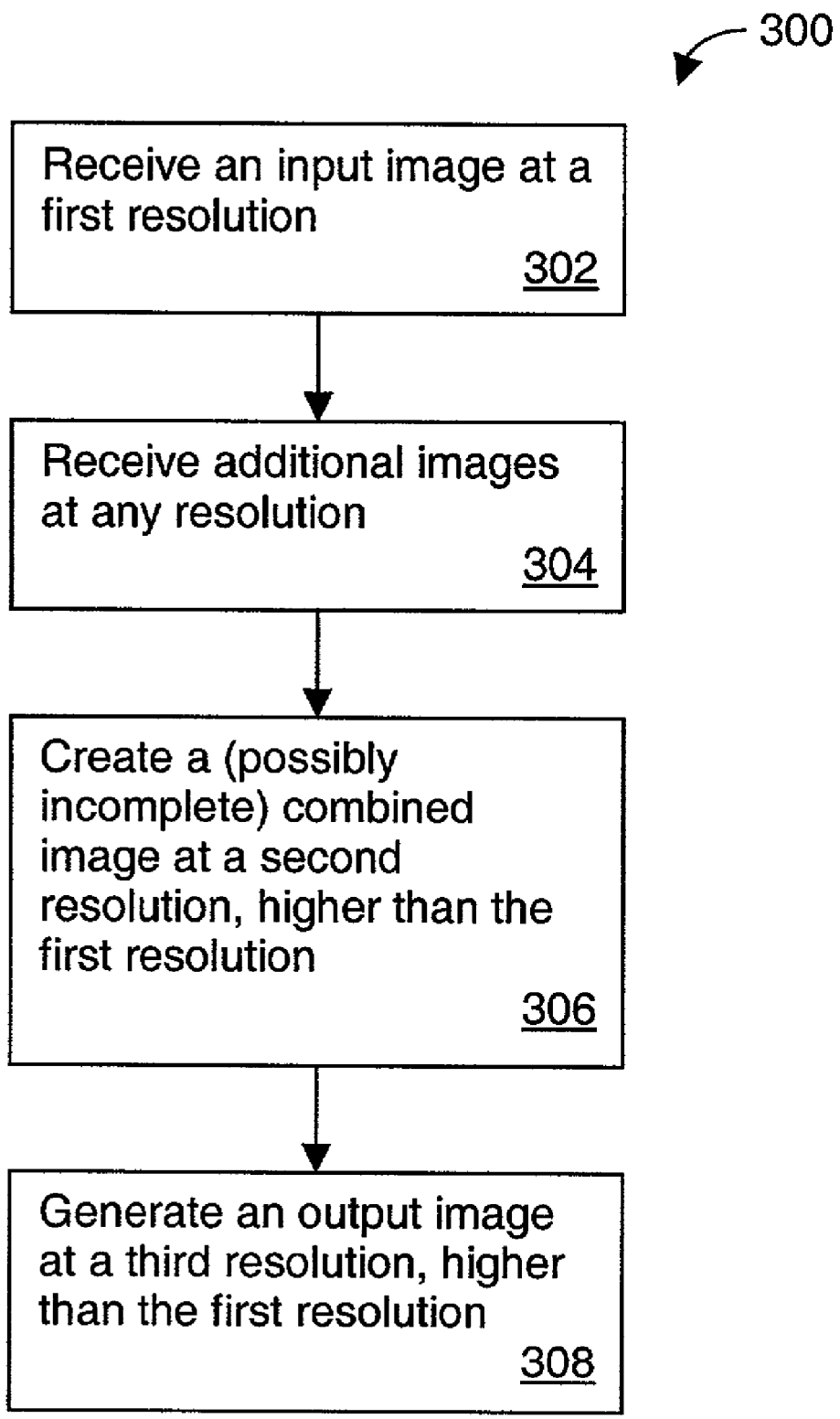
FIG. 3 illustrates one embodiment of the present invention.

FIG. 3 illustrates in block diagram form one embodiment of the method of the present invention 300. In this embodiment, an input image is received at a first resolution 302, additional images at any resolution are received 304, a possibly incomplete combined image at a second resolution (higher than the first) is created 306, and an output image at a third resolution (higher than the first) is generated 306.

For example, an input image may be a video image having a standard television resolution (like NTSC (National Television Systems Committee)). The second image may be, for example, an NTSC image from a different time. The output image however, may be a SVHS (Super Video Home System) image. Another example may be where the input image from, for example, a camera has a pixel resolution of 640×480, the combined image is formed from a collection of images with a pixel resolution of 1280×1024 and the generated output image has a resolution of 1024×768.

It is to be appreciated that the output image has a resolution higher than the input image and less than or equal to the second image resolution. Thus, in the above 640×480 example where the second image contains pixels located on a 1280×1024 grid, the third output resolution may be anything above the 640×480 and up to and including a 1280×1024 resolution. Note however, that the enhanced horizontal and/or vertical resolution may independently have this restriction.

Figure 4:
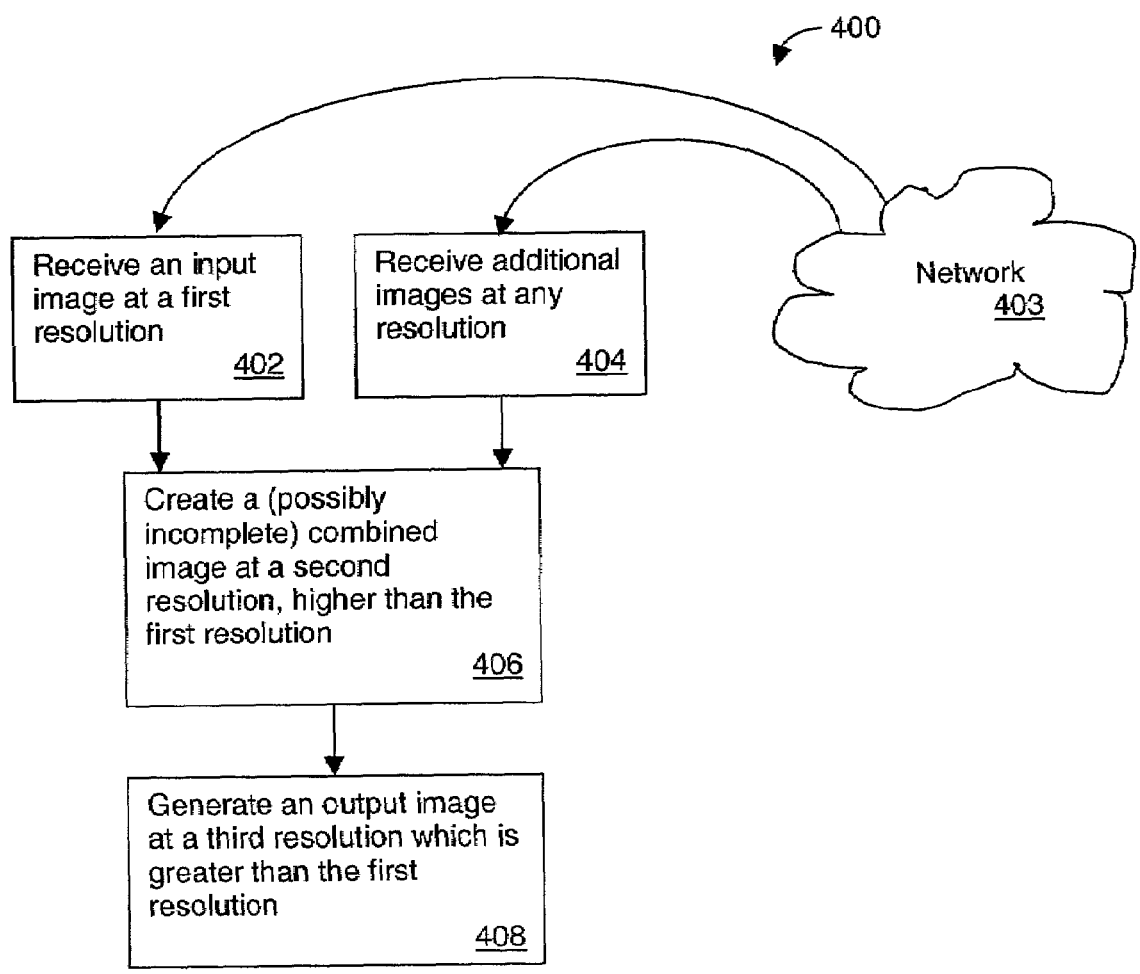
FIG. 4 illustrates another embodiment of the present invention.

FIG. 4 illustrates another embodiment 400 of the present invention. In this illustration, the input image 402 and additional images at any resolution 404 are received from a network 403. At 406 a possibly incomplete combined image at a second resolution (higher than the first) is created, and at 408 an output image at a third resolution (which is greater than the first) is generated. While not illustrated in FIG. 4, the third image 408 may be stored and/or transferred to the network 403. For example, the network 403 may have stored video images that are to be enhanced. Based upon resources available and processing power, the input image 402 may be enhanced by using a second image from 404 and the input image 402 to produce an enhanced output image at a third resolution 408. This enhanced image may be stored on the network 403 for viewing by a user.

For example, in one embodiment, network 403 may represent a home networked database having storage (for instance, a hard disk) on which video images are stored. Processing at 402, 404, 406, and 408 may be performed by computers connected to the network 403. The output of the computer processing (at 408) may then be stored back to the network 403 (for instance, on the hard disk).

Figure 5:
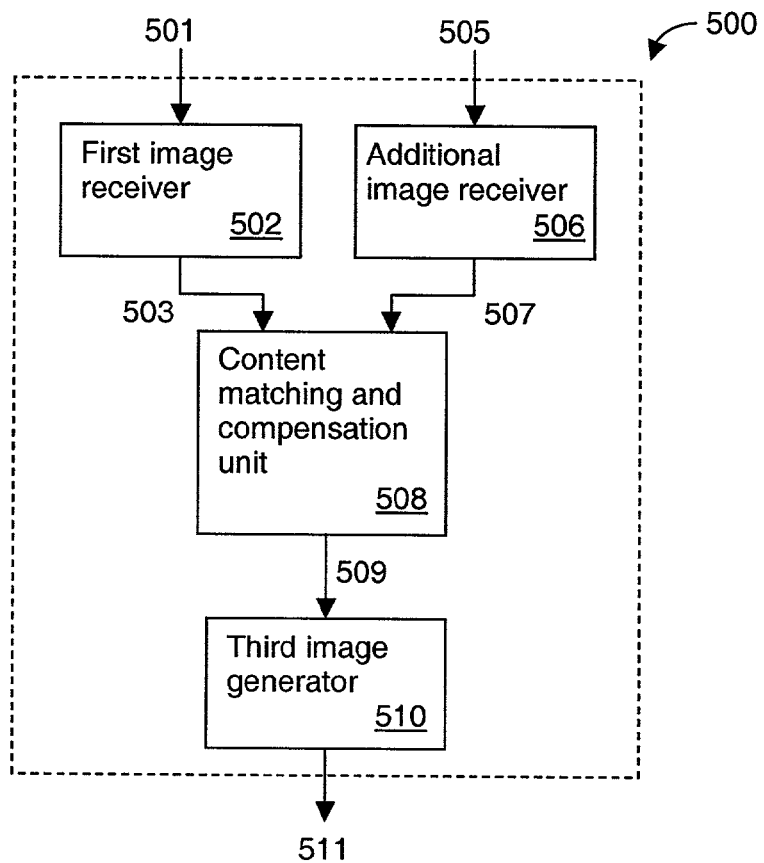
FIG. 5 illustrates a block diagram of one embodiment of the present invention.

FIG. 5 illustrates a block diagram 500 of one embodiment of the present invention. A first image receiver 502 receives a first image from input 501. An additional image receiver 506 receives additional image(s) from input 505. A content matching and compensation unit 508 receives the output 503 from the first image receiver 502 and the output 507 from the additional image receiver 506. A third image generator 510 receives as input the output 509 from the content matching and compensation unit 508. The output 511 of the third image generator is an enhanced version of the image received by the first image receiver 502 from input 501.

In another embodiment, the first image receiver 502 and the additional image receiver 506 may be, for example, a single image receiver where the first and additional images are received at different times. Similarly, in another embodiment, the content matching and compensation unit 508 and the third image generator 510 may be a combined unit that performs the content matching and compensation, and outputs an enhanced image.

Figure 6:
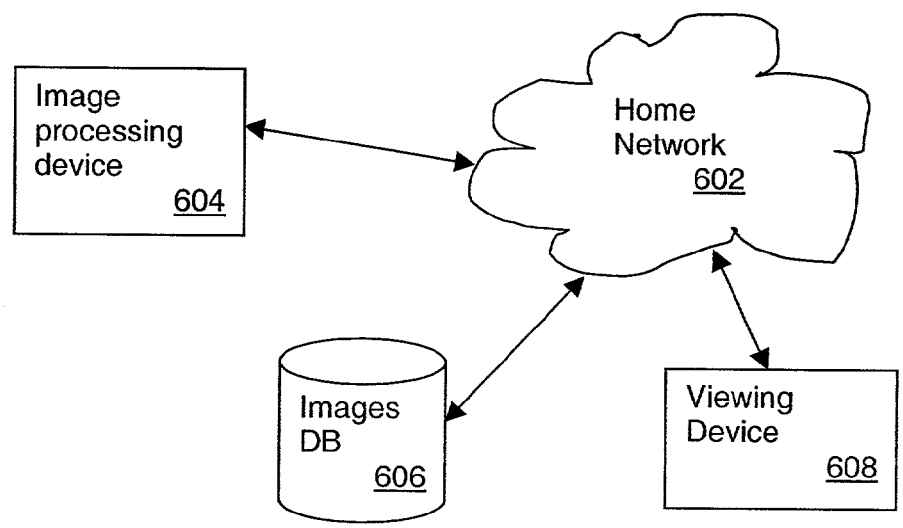
FIG. 6 illustrates one embodiment of the present invention in a home based network.

FIG. 6 illustrates one embodiment of the present invention in a home based network 600. Here the home network 602 is connected to resources such as, an image processing device 604, an images database (DB) 606, and a viewing device 608. In one embodiment, the home network 602 may be, for example, a wired 100 baseT Ethernet, the image processing device 604 a personal computer, the images database 606 may be a hard disk drive attached to the personal computer, and the viewing device 608 may be a computer monitor.

One skilled in the art will appreciate that many variations on the embodiment illustrated in FIG. 6 are possible. For example, the home network 602 may be a wireless network, the image processing device 604 may be a set top box, the images database 606 may be a DVD, and the viewing device 608 may be a high definition television (HDTV).

Figure 7:
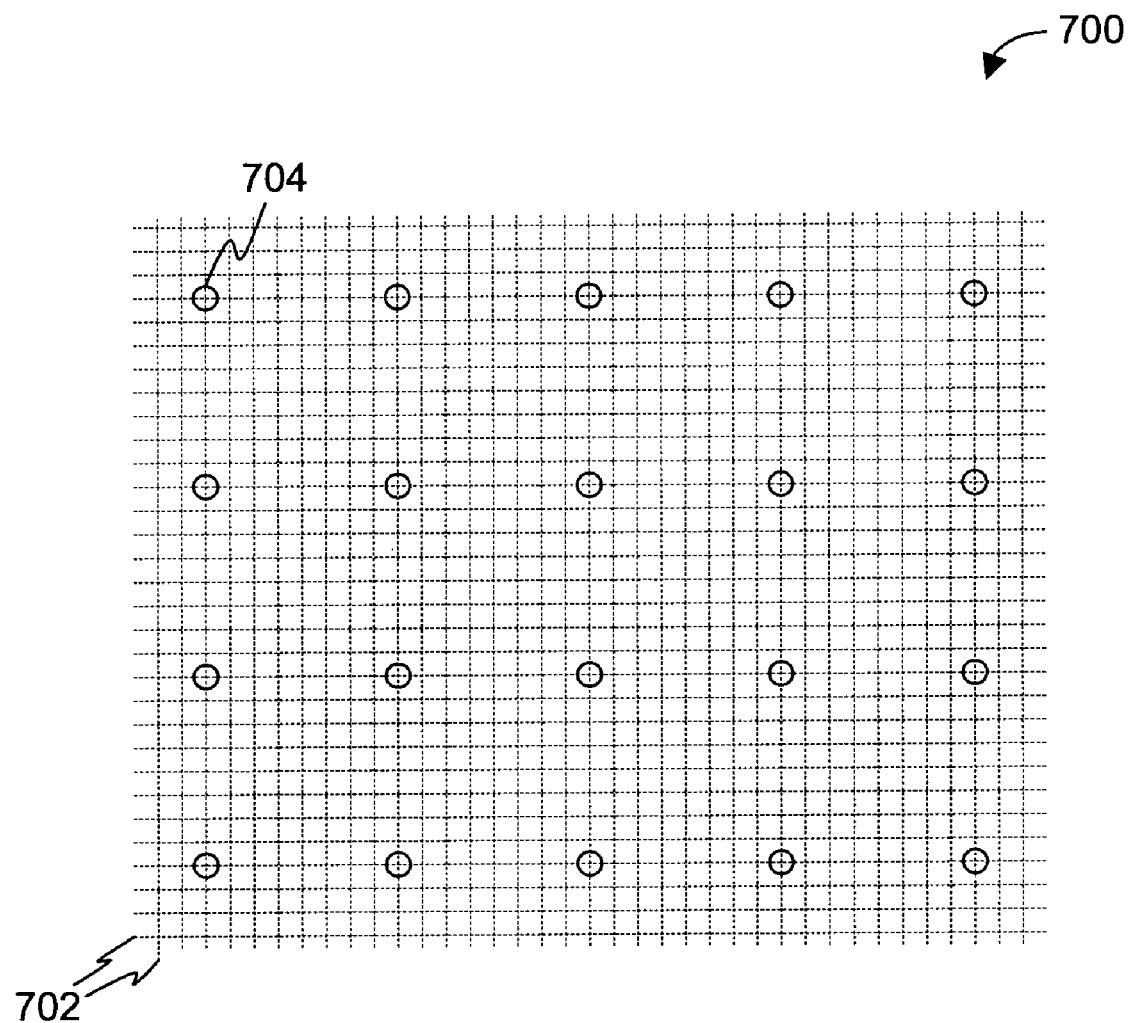
FIG. 7 illustrates an input image at a first resolution.

FIG. 7 illustrates an input image 700 at a first resolution. Circles, such as that denoted by 704, represent pixels located on a finer grid 702. The grid 702 is for illustrative purposes only to facilitate understanding how in one embodiment the present invention may be practiced.

Figure 8:
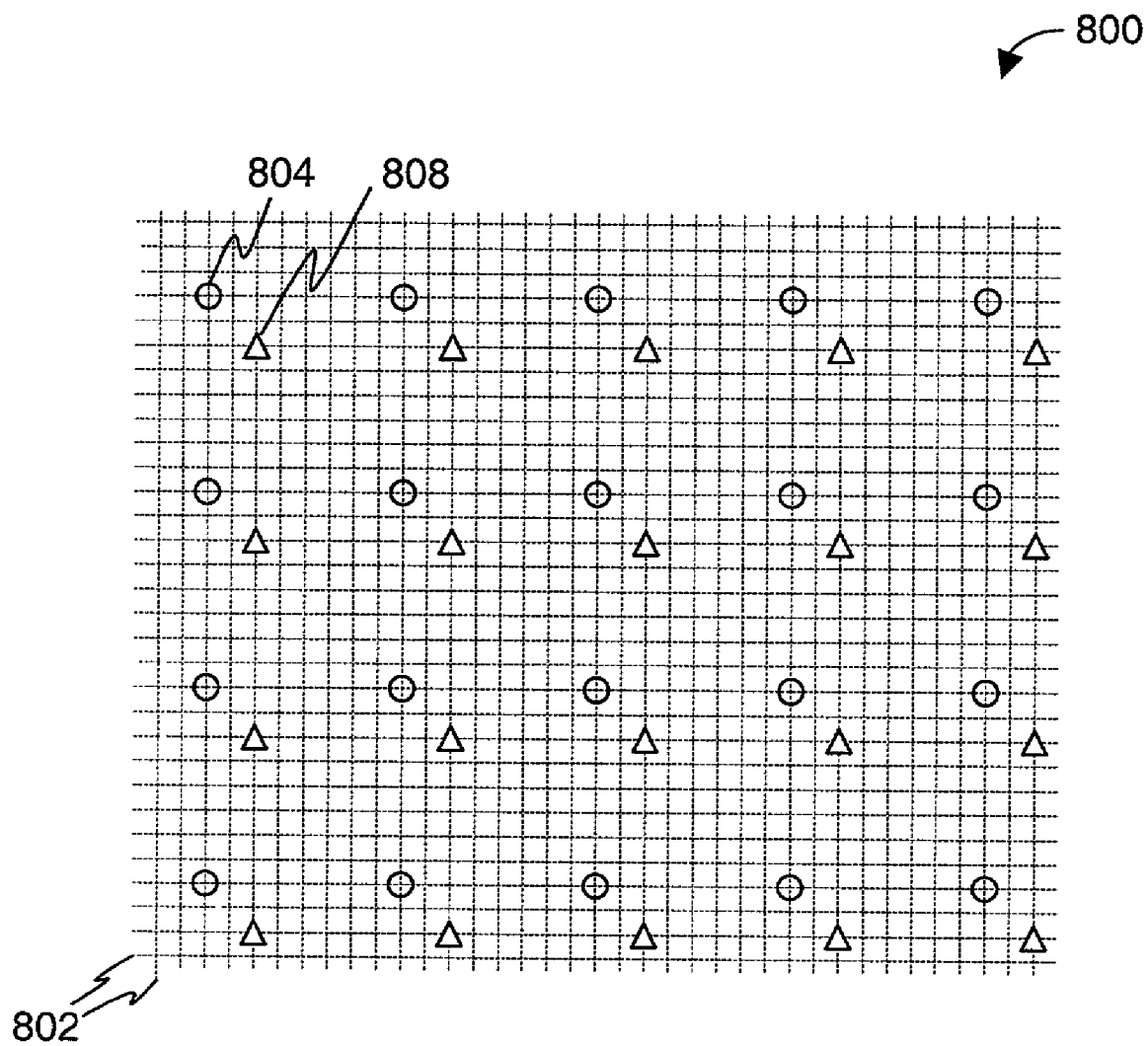
FIG. 8 shows a conventional arrangement for enhancement.

Reconstruction of an image from displaced sampling grids for enhanced resolution has been applied where the offset for the entire sampling grids could be aligned. FIG. 8 shows such a conventional arrangement 800. Here the circles (804 representative) represent a first image and the triangles (808 representative) represent a second image (both shown on a finer grid 802). This approach cannot be applied to video where the overlapping data for a single scene is pieced together from many different sampling grids. In these circumstances, the relative position of the sampling grids may vary considerably from object to object due to differing motions and/or time of image capture of the different objects.

Figure 9:
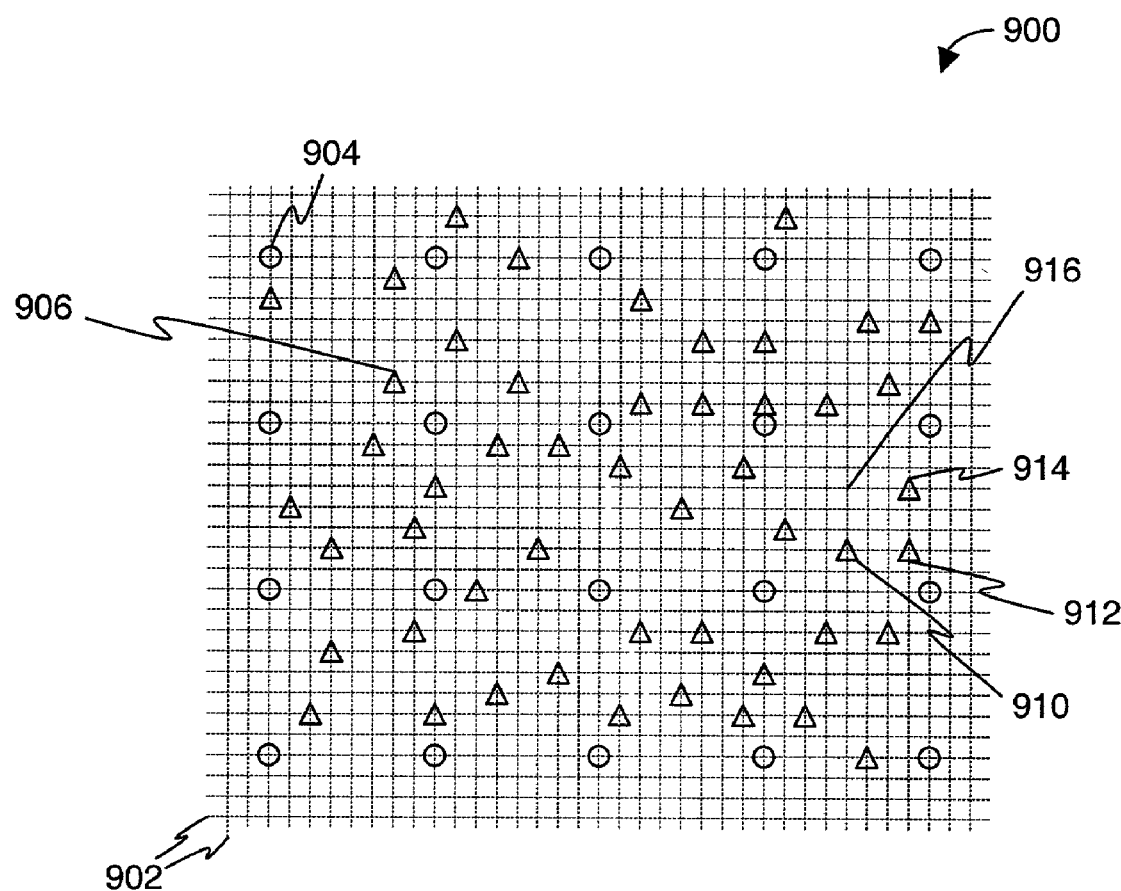
FIG. 9 illustrates combined images having irregularly placed samples at unpredictable locations.

FIG. 9 illustrates a combined image 900 having irregularly placed samples at unpredictable locations. As before, the circles such as that denoted by 904, represent pixels from an input image located on a finer grid 902. Also illustrated by triangles, such as that denoted 906, are pixels matched from other images and located for illustrative purposes on the finer grid 902. As may be seen from FIG. 9, the combined image, represented by circles and triangles, has within it some pixels spaced more closely together than the circles of the original input image. It is important to note that a triangle may be located at the same position as a circle. Also, it is important to notice that triangles are not located at every possible pixel position for a resolution. For example, it will be noted that in the triangle cluster 910, 912, and 914, that there is no triangle at 916.

The fact that the triangles are not necessarily located at every position on the finer grid 902 is an indication of the source of the triangles data. The triangles are obtained by compensating the image formed by only the circles with other data from the network or database. A variety of methods familiar to those skilled in the art may be used to obtain the triangular data. Such methods are often described in the literature as motion compensation techniques. One very popular motion compensation technique, block matching, works in the following way. The system would attempt to match a block of input data (the circles) surrounding an area to be improved with other data available on the network. One common outcome is that the other data is determined to be a good match for the circular data if it is shifted slightly. For example, this might occur when the same object is sampled by a moving camera. This shift has the effect of locating the triangles on the finer grid in locations that do not correspond to the circles. Another common outcome is that the triangles match the circles if the spacing between the triangles is increased or decreased. For example, this might occur when the same object is sampled by a zooming camera. This zooming has the effect of locating the triangles at a different spacing than the circles. Many other possibilities exist for determining triangular data that are not discussed here. The other possibilities might arise from other motion compensation techniques (for example optical flow) or other ways of acquiring similar data. For example, moving objects cause a similar shift as a moving camera. Also similar but different objects might be matched. As new data becomes available to the network, better matches might be found and the triangles may be replaced with the data from the better matches.

There are several important features of the triangles that are to be appreciated to understand the present invention. First, it is to be appreciated that the triangles represent finer resolution pixels albeit that not all pixels may be present. Second, the triangles may represent derived values themselves. For example, the information for the triangles may have been derived from finer girds, non-uniform grids, etc. For example, the triangles as illustrated in FIG. 9 may be motion compensated pixels. Third, the triangles may change with time. For example, a new motion compensation approach may be used that results in different triangles. Likewise, the same motion compensation may be used but a different second image is used to create the differing triangles. It is to be understood that the triangle generation is not part of the claimed present invention but is included to illustrate clearly the full capabilities of the present invention.

Based on the fact that the triangles can vary over time, one appreciates that, as illustrated in FIGS. 3, 4, and 5, the output image generated at 306, 406, and 511 may vary over time. For example, a video sequence of a family outing at a first resolution may be the input image at a first resolution. The second image at a second resolution may be close-ups of the family members which offers a higher resolution of the facial features. The enhanced output image at a third resolution may be based on the use of the added resolution in the second images to enhance the resolution of the input images. Thus one can understand how, if new second images are available, that the enhanced images may be different over time. Additionally, the compensated image at a second resolution may have pixels derived from a new pixel compensation approach and thus the output image may change.

FIG. 9 further illustrates an alignment of pixels on a grid that might arise from video after pixel compensation. The actual before compensation case may be much more complicated involving many more objects. The present invention provides for reconstruction from irregularly placed samples.

Assume that the sample pixel locations are not easily predictable, but that the locations can be determined from the data available at the time of interpolation. This is a natural consequence of the way that the data is acquired.

For example, in one embodiment, one might employ a special version of a content-addressable memory (CAM) to obtain additional samples of an image object. This memory would input a region that is to be improved and output up to L locations where the data is similar to that being estimated. By a statistical process, or by block matching and thresholding, the system can determine which of these samples are derived from different samples of the same object. Next, the system may scale this data to a reference size, and determine the relative offset between the sampling locations. This scaling and offset may be accomplished by conventional motion compensation techniques. The result of this matching is a haphazard collection of sampling points, as illustrated in FIG. 9.

To apply the present invention interpolation technique, the collection of sampling points shown in FIG. 9 have been "snapped" to a predetermined grid (as represented by 902). The resolution of this grid generally will match that of the training sequences described below. The snapping may be accomplished by bi-linear interpolation, a phase-shift filter, or a variety of established techniques.

Figure 10:
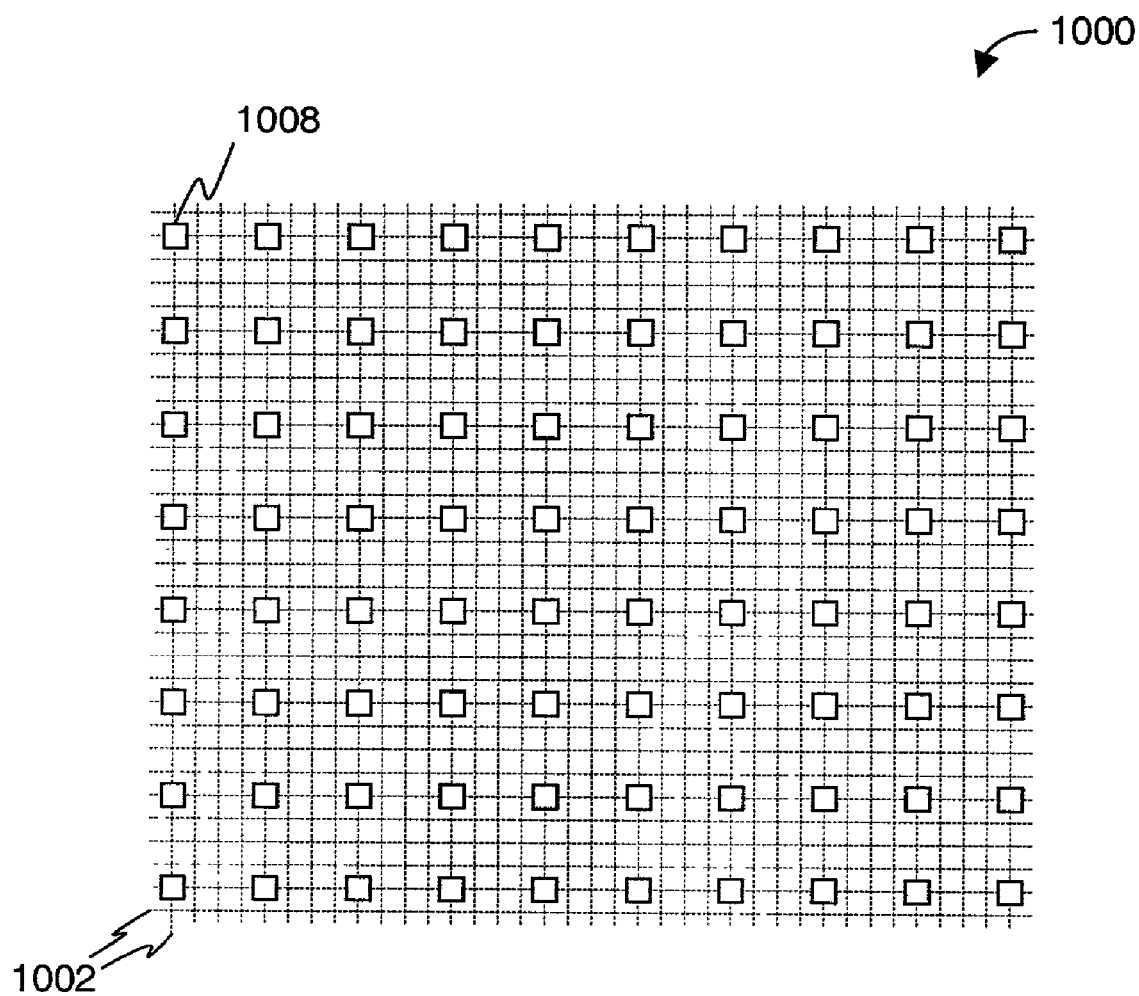
FIG. 10 illustrates an output pixel resolution that may represent an output image.

FIG. 10 illustrates 1000 an output pixel resolution that may represent the desired output image. Here, the squares (1008 representative) represent the pixel locations. Again, for illustrative purposes, a grid 1002 is shown.

Figure 11:
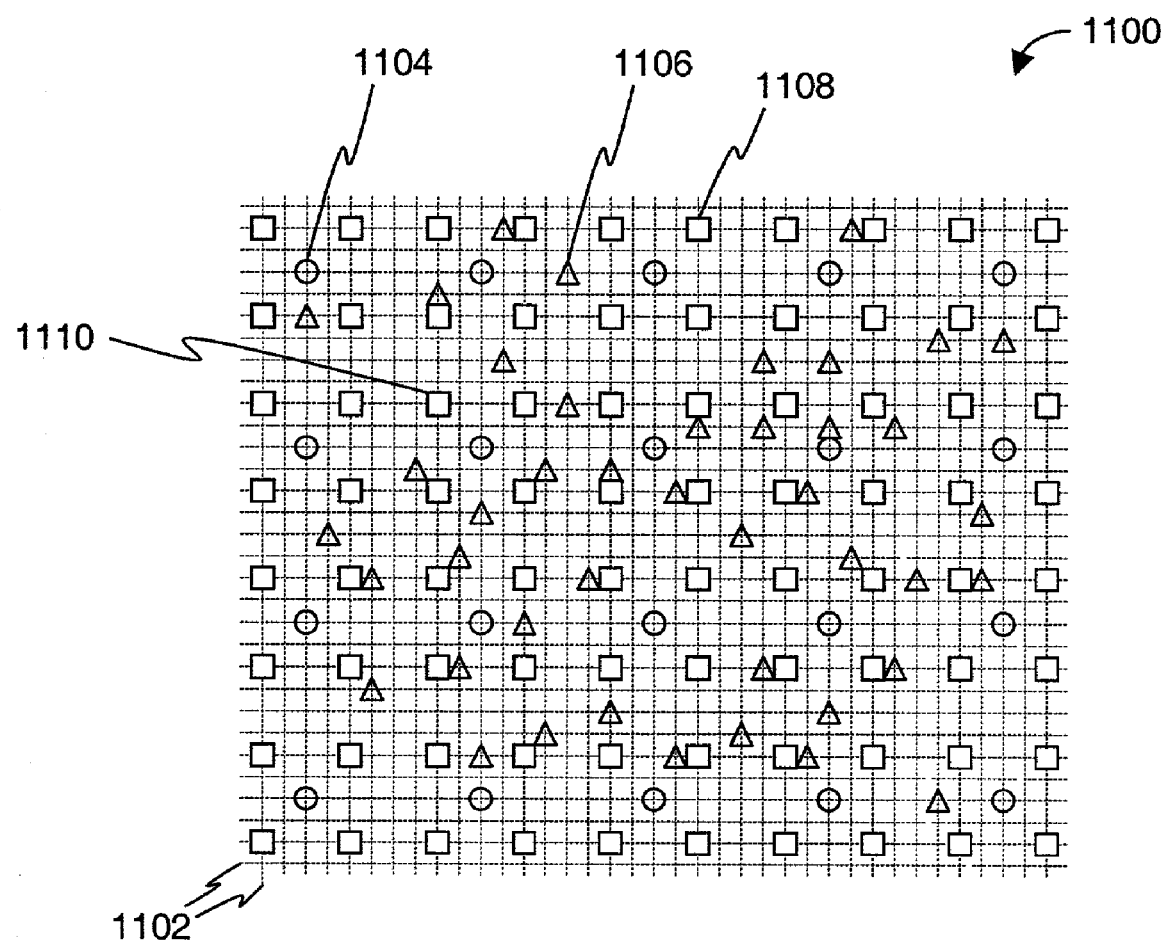
FIG. 11 illustrates an example of input data, a second image, and an output image all on a grid.

FIG. 11 illustrates 1100 all the data, again on a grid 1102. Here, the circles (1104) represent the input data, the triangles (1106) represent the second image, and the squares (1108) represent the output image. It should be noted that the output image may coincide with some of the input data or second image data. For example, the output at 1110 coincides with second image input data at 906 (FIG. 9).

In one embodiment, the present invention rather than using functional interpolation techniques, uses a numerical method derived from off line learning on a set of training images. The system determines the least squares filter that is optimal on the training set, subject to the available sample location data. This occurs once for each output pixel. Since the available locations are unknown in advance of their use, this last step of the filter creation is performed by the database once for each pixel in the output image. The filter is then applied, and the higher definition data is created.

The method requires one set of training images defined at the desired output resolution (the desired images) and a corresponding set of training images defined at the resolution defined by the sample grid (the grid images). In some embodiments, the resolution of the sampling grid may be the same as that of the desired output, in which case the desired images and the sampled images may be the same. Otherwise, the images defined on the sampling grid should be a higher resolution version of the desired images.

Thus, one is to appreciate that we are referring to up to three different resolutions in our descriptions. The images to be improved by the system have the lowest resolution. They will be improved to a resolution equal to that of the desired images. The resolution of the desired images is less than or equal to the resolution of the grid images. The desired output image data is used in a manner described below to form a vector of desired response. The set of images defined at the sampling grid resolution are used to form the matrix of observations.

Figure 12:
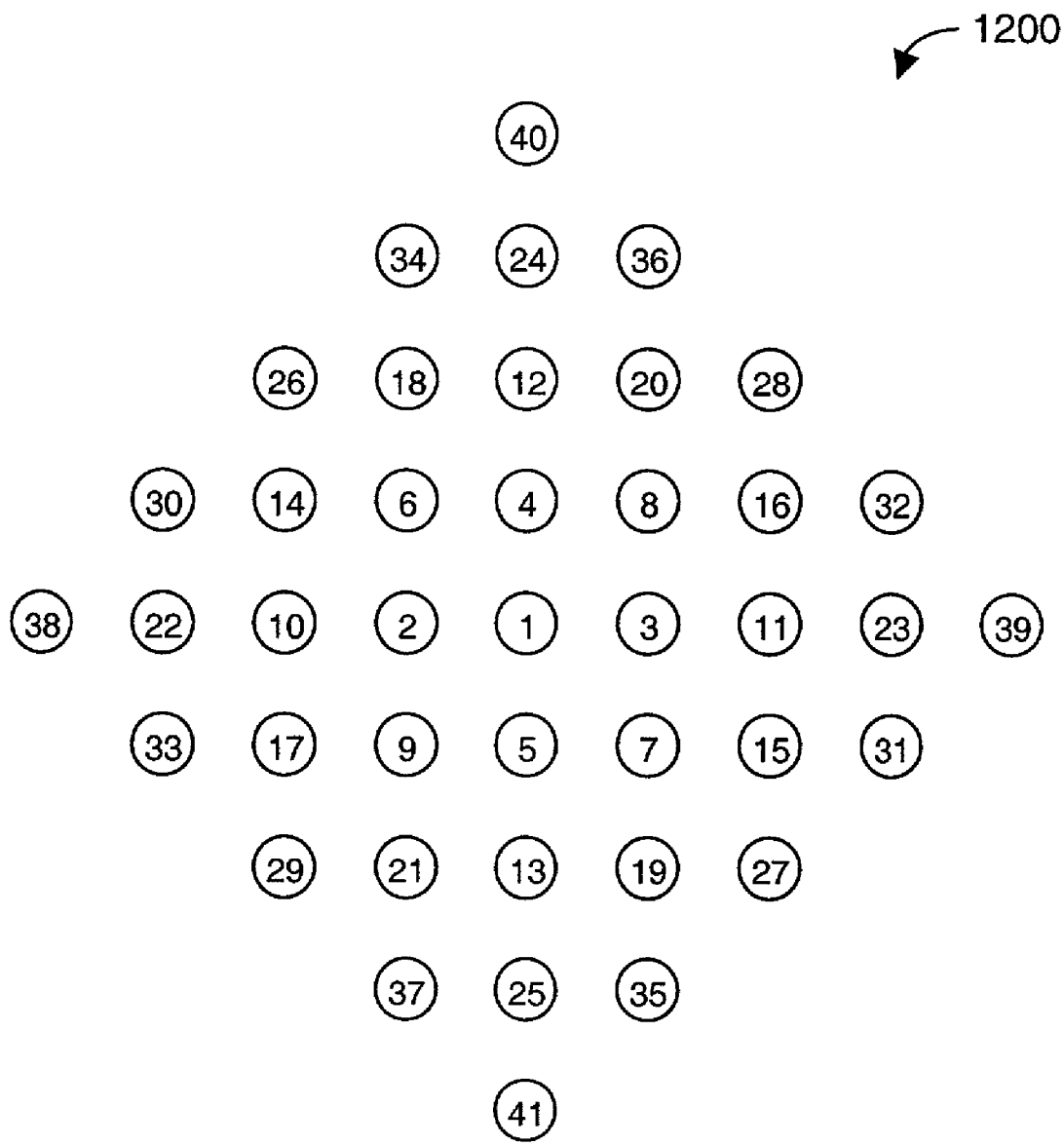
FIG. 12 illustrates a training tap comprising N=41 pixels.

A training may begin by scanning over the desired images set and filling the training tap with corresponding pixels from the grid images. The pixels in the training tap are arranged in a predetermined order. For example, in one embodiment, FIG. 12 illustrates 1200, a training tap comprising N=41 pixels. The numbers were chosen to roughly indicate the order of importance of each pixel in estimating a pixel in the center (at location 1) at the desired resolution. In the case where the desired resolution is the same as the grid resolution, then the center pixel of the tap contains a value similar or equal to that being estimated.

Thus, in the present embodiment, the case where the training (i.e. estimation) tap includes the point to estimate is considered. This is done in conjunction with preparation for the general case, i.e. where information is gathered from all training locations which may be available. This training therefore does not preclude the event that the center pixel is not available.

For each of the M training pixels, N tap values are gathered. Each set of tap values contributes one row to an M-by-N observation matrix, A. The corresponding desired image pixels are stored in an M element vector b. In the case where the desired resolution equals the grid resolution and the tap shown in FIG. 12 is used, then the vector b may be equal to the first column of A.

Assume that the training is complete and that A and b are known by the database. To improve the resolution of the target image, the database server constructs a sparsely sampled image at the grid resolution and reserves space for an image at the desired resolution. In a manner that is similar to the training scan, the server scans through the desired image pixels. For each pixel, the server fills the estimation tap with pixels from the sparely sampled grid image. Tap locations which can be filled are recorded in numerical order in the index set I. As described below, an interpolation filter is formed by using locations corresponding to the first K indices.

Continuing with the above example, let $i_1, i_2, \ldots, i_K$ be the first K indices in I. The M-by-K reduced observation matrix $A_r$ is formed from columns $i_1, i_2, \ldots, i_K$ of A taken in this order. The least squares optimal estimation filter $x_{LS}$ is the K element vector found by minimizing $$\|A_r x - b\|_2^2 \quad (1)$$

with respect to x. If the minimum is not unique, then in one embodiment, the standard practice of choosing the minimum norm solution is followed. The output pixel is determined accordingly as the result of $$\sum_{k=1}^{K} x_{LS}(k) * y(i_k) \quad (2)$$

where $x_{LS}(k)$ is the $k^{th}$ element of $x_{LS}$ and $y(i_k)$ is the value of the tap with index $i_k$.

In one embodiment, A or b may not be stored since the same result can be obtained using less memory by storing $A^T A$ and $A^T b$ which can easily be accumulated at the time of training. From $A^T A$ and $A^T b$, $A_r^T A_r$ and $A_r^T b$ can be derived and $x_{LS}$ can be determined as the minimum norm vector which satisfies $$A_r^T A_r x_{LS} = A_r^T b \quad (3)$$

What follows for purpose of illustration is a detailed example that one skilled in the art will understand and appreciate as one embodiment. Using FIG. 13 as the starting point for discussion, suppose the server begins with an image whose pixels are represented as circles (1302 representative). After searching the content sensitive memory for a similar object and adjusting its position relative to the known data and grid, the server finds additional sample points, as indicated by the triangles (1304 representative). The goal is to estimate the pixel value of the enhanced image with pixel values at locations marked by the circles (O), triangles (Δ), and x's (X). No sample data is provided for the locations marked with x's.

Figure 13:
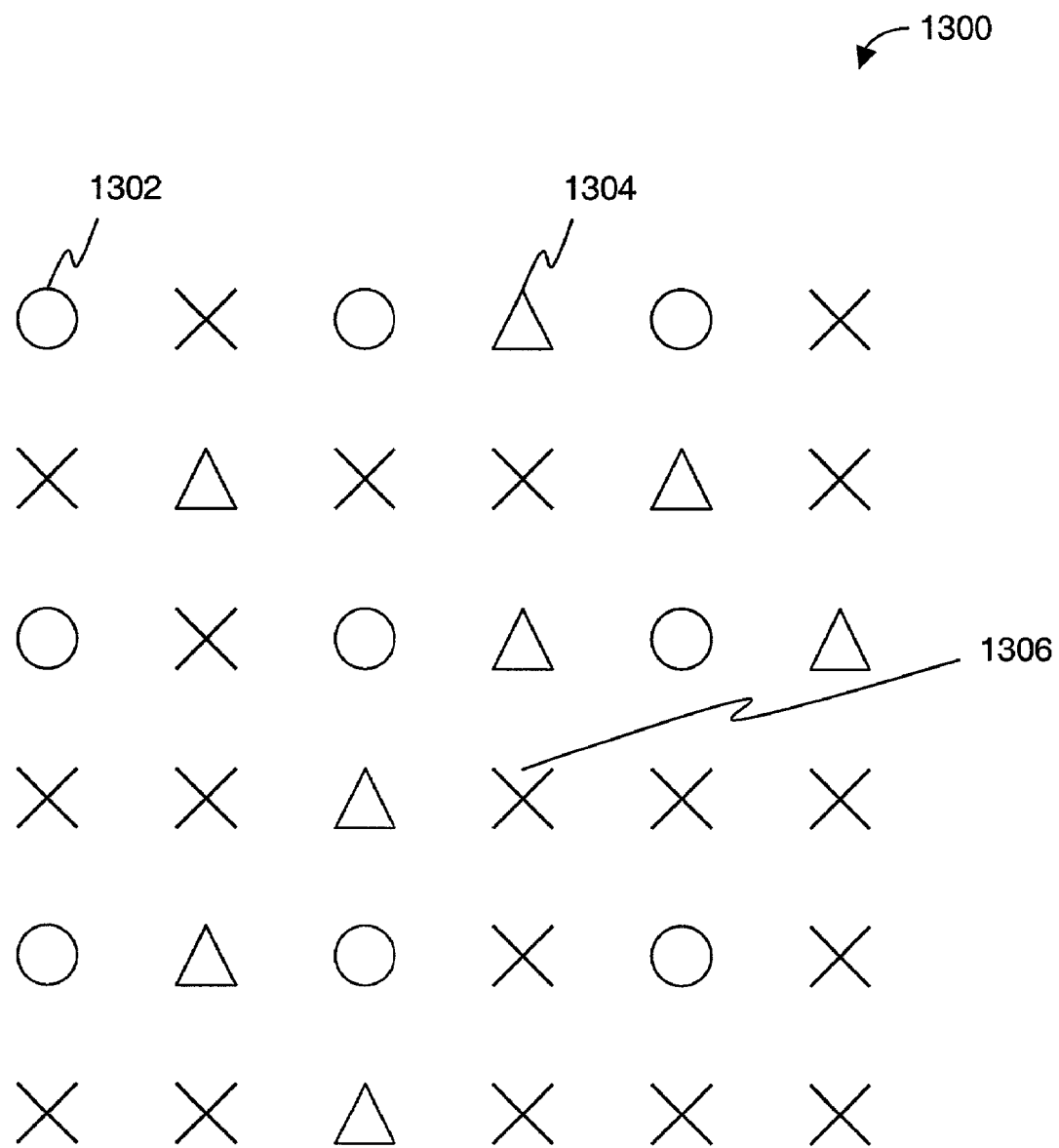
FIG. 13 illustrates an example of a structure of image data and additional samples on an interpolation grid.

Thus, FIG. 13 illustrates 1300 a structure of an example of image data after snapping additional samples to the interpolation grid. The circles (1302) indicate the input or reference data that is to be improved. The triangles (1304) represent additional samples and x's (1306) represent output location with no representative samples. The output image, in this example, will have data at every location marked with a circle, triangle, or an x.

Figure 14:
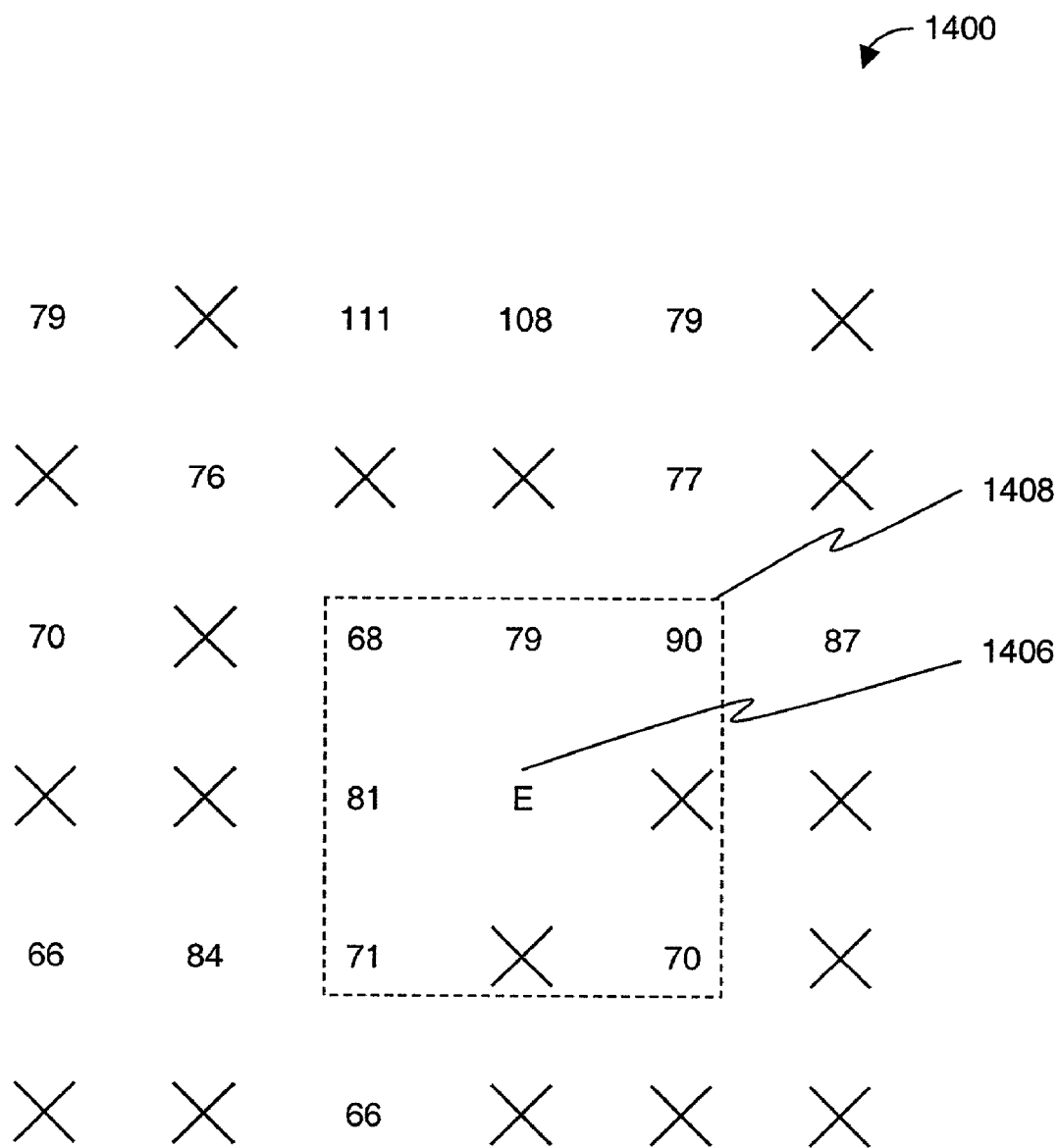
FIG. 14 represents FIG. 13 with some example values.

To illustrate a precise example, the symbols used in FIG. 13 are replaced with pixels values as shown in FIG. 14. The example shows the technique used to estimate the pixel value at location E (1406) (1306 in FIG. 13). The dotted box 1408 outlines the boundaries of the tap (a 3-by-3 square tap in this example) used to estimate the value of E (1406).

Figures 15, 16, 17:
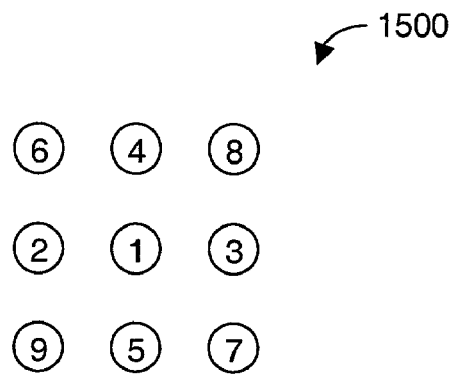
FIG. 15 represents a 3-by-3 square tap.
FIG. 16 represents example values for a 3-by-3 tap of FIG. 15.
FIG. 17 represents another example of values for a less than full 3-by-3 tap of FIG. 15.

Suppose previous training has been accomplished using the 3-by-3 square tap 1500 shown in FIG. 15. (For consistency of illustration, FIG. 15 is numbered similar to FIG. 12.) Training with these 9 taps produces the M-by-9 matrix A, and the M element vector b, or equivalently the 9-by-9 matrix $A^T A$ and the 9-element vector $A^T b$. Let the value of $A^T A$ and $A^T b$ be as indicated below.

$$A^T A = \begin{bmatrix} 446972 & 445074 & 445551 & 446165 & 446002 & 444410 & 444720 & 445434 & 444791 \\ 445074 & 446496 & 442563 & 444958 & 444245 & 445690 & 441913 & 442900 & 445526 \\ 445551 & 442563 & 447449 & 444885 & 445268 & 442082 & 446479 & 446642 & 442728 \\ 446165 & 444958 & 444885 & 447134 & 444561 & 445240 & 443602 & 445717 & 443896 \\ 446002 & 444245 & 445268 & 444561 & 446810 & 443129 & 445386 & 444372 & 444909 \\ 444410 & 445690 & 442082 & 445240 & 443129 & 446659 & 441251 & 442733 & 444087 \\ 444720 & 441913 & 446479 & 443602 & 445386 & 441251 & 447288 & 445037 & 442393 \\ 445434 & 442900 & 446642 & 445717 & 444372 & 442733 & 445037 & 447612 & 442575 \\ 444791 & 445526 & 442728 & 443896 & 444909 & 444087 & 442393 & 442575 & 446334 \end{bmatrix} \quad (4)$$

$$A^T b = \begin{bmatrix} 446972 \\ 445074 \\ 445551 \\ 446165 \\ 446002 \\ 444410 \\ 444720 \\ 445434 \\ 444791 \end{bmatrix} \quad (5)$$

To estimate the value at E (1406), it is noted that samples from tap locations I={2, 4, 6, 7, 8, 9} are available. The reduced matrices $A_r^T A_r$ is formed from the submatrix of $A^T A$ from these corresponding rows and columns:

$$A_r^T A_r = \begin{bmatrix} 446496 & 444958 & 445690 & 441913 & 442900 & 445526 \\ 444958 & 447134 & 445240 & 443602 & 445717 & 443896 \\ 445690 & 445240 & 446659 & 441251 & 442733 & 444087 \\ 441913 & 443602 & 441251 & 447288 & 445037 & 442393 \\ 442900 & 445717 & 442733 & 445037 & 447612 & 442575 \\ 445526 & 443896 & 444087 & 442393 & 442575 & 446334 \end{bmatrix} \quad (6)$$

$$A_r^T b = \begin{bmatrix} 445074 \\ 446165 \\ 444410 \\ 444720 \\ 445434 \\ 444791 \end{bmatrix} \quad (7)$$

The vector $x_{LS}$ that satisfies Eq.(3) is $$x_{LS} = \begin{bmatrix} 0.279372 \\ 0.612161 \\ -0.252102 \\ 0.214782 \\ -0.010896 \\ 0.157611 \end{bmatrix} \quad (7)$$

giving rise to the optimal filter tap shown in FIG. 16. Applying Eq. (2) to the data in FIG. 14 and rounding the result, the pixel value at E (1406) is estimated to be 79.

FIG. 16 represents the values 1600 of the respective taps as shown in FIG. 15. That is the upper left corner, tap 6 in FIG. 15, corresponds to the upper left corner value of −0.252102 in FIG. 16.

Suppose for the sake of illustration, in another embodiment, that due to hardware limitations, only a 5 element filter can be used. Then according to the method discussed herein, with K=5, I is redefined to contain the first 5 available taps. That is I={2,4,6,7,8}. In this event, the following is derived:

$$A_r^T A_r = \begin{bmatrix} 446496 & 444958 & 445690 & 441913 & 442900 \\ 444958 & 447134 & 445240 & 443602 & 445717 \\ 445690 & 445240 & 446659 & 441251 & 442733 \\ 441913 & 443602 & 441251 & 447288 & 445037 \\ 442900 & 445717 & 442733 & 445037 & 447612 \end{bmatrix} \quad (9)$$

$$A_r^T b = \begin{bmatrix} 445074 \\ 446165 \\ 444410 \\ 444720 \\ 445434 \end{bmatrix} \quad (10)$$

Solving for $x_{LS}$ gives the tap shown in FIG. 17. Applying this filter gives the estimate E=81.

$$x_{LS} = \begin{bmatrix} 0.4727620 \\ 0.5966274 \\ -0.3018523 \\ 0.2419460 \\ -0.0087446 \end{bmatrix} \quad (11)$$

FIG. 17 represent the values 1700 of the respective taps as shown in FIG. 15. That is the upper left corner, tap 6 in FIG. 15, corresponds to the upper left corner value of −0.03018523 in FIG. 17. It should be noted that since this example is limited to 5 taps (that is I={2,4,6,7,8}) tap 9 is not used (in this particular example tap 9 has a value of zero).

For purposes of discussing and understanding the invention, it is to be understood that various terms are used those knowledgeable in the art to describe techniques and approaches. Furthermore, in the description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk- read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of skill in the art will immediately appreciate that the invention can be practiced with computer system configurations other than those described, including handheld devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . .), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for resolution enhancement for images stored in a database have been described. According to the present invention, a database, such as a home database server may serve a greater purpose than just warehousing and streaming data. By revisiting and improving the existing data based on new inputs, the user's data may be enhanced.

What is claimed is:

1. A method for image enhancement comprising:
   receiving an input image;
   matching regions of the input image to other available data;
   forming a combined image by snapping pixels in the input image and pixels in the matching regions to a grid corresponding to a resolution for a set of training images, the combined image containing some pixels spaced more closely than the input image; and
   generating an output image by applying a filter associated with the set of training images to the combined image, the filter comprising an optimal least squares filter distinctively determined for each pixel of the output image, wherein the output image resolution is finer than the input image resolution.

2. The method according to claim 1, wherein the output image resolution is less than or equal to the resolution of the set of training images.

3. The method of claim 1 wherein the optimal least squares filter for each output pixel is based on an irregular sample grid.

4. The method of claim 1 wherein the other available data changes over time.

5. The method of claim 1 wherein the image and the other available data are video images in a home networking database.

6. The method of claim 1 further comprising the transfer of a payment before the output image is viewed by a user.

7. A processing system comprising an electronic data processor, which, when executing a set of instructions, performs the method of claim 1.

8. A computer readable medium having stored thereon instructions, which, when executed, perform the method of claim 1.

9. The computer readable medium of claim 8 wherein the input image is retrieved from and the output image is stored to a home networked database.

10. An apparatus for image enhancement comprising:
    means for receiving an input image;
    means for matching regions of the input image to other available data;
    means for forming a combined image by snapping the pixels in the input image and pixels in the matching regions to a grid corresponding to a resolution for a set of training images, the combined image containing some pixels spaced more closely than the input image, and
    means for generating an output image by applying a filter associated with the set of training images to the combined image, the filter comprising an optimal least squares filter distinctively determined for each pixel of the output image, wherein the output image resolution is finer than the input image resolution.

11. The apparatus according to claim 10, wherein the output image resolution is less than or equal to the resolution of the combined image.

12. The apparatus of claim 10 wherein the optimal least squares filter for each output pixel is based on an irregular sample grid.

13. The apparatus of claim 10 wherein the other available data changes over time.

14. The apparatus of claim 10 wherein the image and the other available data are video images in a home networking database.

15. A system comprising an electronic data processor, which, when executing a set of instructions, performs a method comprising:
retrieving a first video image at a first resolution;
forming a second video image at a second resolution by snapping pixels in the first video image and sample pixels in an additional video image to a grid corresponding to a resolution for a set of training images; and
generating a third video image by applying a filter associated with the set of training images to the second video image, the filter comprising an optimal least squares filter distinctively determined for each pixel of the third video image, wherein the third video image is at a third resolution that is finer than the first resolution.

16. The system of claim 15 wherein the third resolution is less than or equal to the second resolution.

17. The system of claim 15 wherein the first and second video images have missing pixels.

18. The system of claim 15 wherein the second and third video images change over time.

19. The system of claim 15 wherein the additional video image is located on a home networking database.

20. An apparatus comprising:
means for receiving a input image having pixels at a first resolution;
means for receiving other available data having pixels at a second resolution;
means for forming a combined image by snapping the pixels at the first resolution and pixels at the second resolution to a grid corresponding to a resolution for a set of training images, the combined image containing some pixels spaced more closely than the input image, and;
means for generating an output image at a resolution finer than the input image resolution by applying a filter associated with the training images to the combined image pixels, the filter comprising an optimal least squares filter distinctively determined for each pixel of the output image.

21. The apparatus of claim 20 wherein applying a filter to the combined image pixels comprises applying the filter by a numerical tap method.

22. The apparatus of claim 20 where the means for forming a combined image comprises means for motion compensation.

23. An apparatus for image enhancement comprising:
a first device having an input and an output, the input coupled to receive a first image to be enhanced;
a second device having an input and an output, the input coupled to receive a second image;
a third device having a first input, a second input, and an output, the first input coupled to receive the first device output, and the second input coupled to receive the second device output, wherein the third device snaps pixels from the first and second images to a grid having a resolution for a set of training images, and applies a filter associated with the set of training images to the pixels, the filter comprising an optimal least squares filter distinctively determined for each pixel of a third enhanced image, and the grid resolution being finer than that of the first image; and
a fourth device having an input and an output, the input coupled to receive the third device output and the fourth device output coupled to send said third enhanced image, wherein the third enhanced image has a resolution that is less than or equal to the resolution of the grid.

24. The apparatus of claim 23 wherein the first device input and second device input are coupled to a home network.

25. The apparatus of claim 23 wherein the fourth device output is coupled to a home network.

26. The apparatus of claim 23 wherein the third device further comprises a least squares filtering device having an input and an output, the input coupled to receive an image, the output coupled to send a filtered image.

* * * * *